US007312968B2

(12) United States Patent
Kahara et al.

(10) Patent No.: US 7,312,968 B2
(45) Date of Patent: Dec. 25, 2007

(54) STARTER-RELAY CONTROL CIRCUIT WITH SELF FAULT DIAGNOSIS FUNCTION

(75) Inventors: Ryuzo Kahara, Kariya (JP); Yuichiro Matsuura, Kariya (JP)

(73) Assignee: Denso Corporation, Kariya, Aichi-pref (JP)

( * ) Notice: Subject to any disclaimer, the term of this patent is extended or adjusted under 35 U.S.C. 154(b) by 414 days.

(21) Appl. No.: 11/109,955

(22) Filed: Apr. 20, 2005

(65) Prior Publication Data

US 2005/0236900 A1 Oct. 27, 2005

(30) Foreign Application Priority Data

Apr. 21, 2004 (JP) ............................ 2004-125726

(51) Int. Cl.
*H02H 3/00* (2006.01)

(52) U.S. Cl. ...................................................... 361/93.1

(58) Field of Classification Search ................ 361/93.1
See application file for complete search history.

(56) References Cited

U.S. PATENT DOCUMENTS 3,859,540 A * 1/1975 Weiner ..................... 290/38 R
5,379,733 A * 1/1995 Haddick et al. ....... 123/179.17
6,148,781 A * 11/2000 Boegner et al. ......... 123/179.3

FOREIGN PATENT DOCUMENTS

| | | |
|---|---|---|
| JP | 8-261119 | 10/1996 |
| JP | 2000-145491 | 5/2000 |
| JP | 2004-84655 | 3/2004 |

* cited by examiner

*Primary Examiner*—Stephen W. Jackson
(74) *Attorney, Agent, or Firm*—Nixon & Vanderhye P.C.

(57) ABSTRACT

In a starter-relay control circuit, a high-side switching element is connected between a first output line connected to a high-side terminal and an ignition power line connected to the ignition switch. A low-side switching element is connected between a second output line connected to a low-side terminal and a ground line connected to a negative terminal of the battery. A pull-up element is connected between the ignition power line and the first output line. A pull-down element is connected between the ground line and the second output line. A failure detecting unit is connected to the first and second output lines and configured to determine whether a failure wherein the high-side terminal is short-circuited to the positive terminal of the battery occurs based on a voltage of the second output line when the ignition switch is in an off position.

10 Claims, 4 Drawing Sheets

STARTER-RELAY CONTROL CIRCUIT WITH SELF FAULT DIAGNOSIS FUNCTION

CROSS REFERENCE TO RELATED APPLICATION

This application is based on Japanese Patent Application 2004-125726 filed on Apr. 21, 2004 and claims the benefit of priority therefrom, so that the descriptions of which are all incorporated herein by reference.

BACKGROUND OF THE INVENTION

FIELD OF THE INVENTION

The present invention relates to a starter-relay control circuit with a self fault diagnosis function.

In conventional vehicles, such as automobiles, energization of a coil of a starter relay turns the starter relay on, so that power from a battery is supplied to a starter motor to activate it. The activating of the starter motor makes an engine start. Specifically, the activating of the starter motor causes the crankshaft of the engine to start to rotate.

An example of an apparatus for controlling starting of an engine is disclosed in Japanese Unexamined Patent Publication No. 2004-84655. In this publication, a switching member is provided in an electronic control unit (ECU) for controlling an engine, wherein the switching member is operative to switch between energization and non-energization of the coil of the starter relay. Specifically, when a vehicle driver operates a starter switch to turn it on, the on of the starter switch causes the ECU to turn the switching member on, allowing a current to flow through the coil. The current flowing through the coil turns the starter relay on.

In such an apparatus for controlling starting of an engine, in order to improve the responsibility of the apparatus, the apparatus is provided with a first switching member located at the high-side (upstream) of a coil of a starter relay, and a second switching member located at the low-side (downstream) of the coil. An ECU turns simultaneously the first and second switching members on, allowing a current to flow through the coil.

Specifically, as illustrated in FIG. 4, the negative terminal of a starter motor 3 is constantly connected to a ground electrode (GND) whose potential is 0 [V (volts)] at the exterior of an ECU 101. The potential of the ground electrode corresponds to that of the negative electrode of a battery 5. The positive terminal of the starter motor 3 is connected to the positive electrode of the battery 5 through a pair of contacts of the starter relay 7. When a current flows through the coil 9 of the starter relay 7, the starter relay 7 is turned on, in other words, the paired contacts of the starter relay 7 are short-circuited to each other. The on state of the starter relay 7 allows power to be supplied from the battery 5 to the starter motor 3 to activate it, causing an engine to start cranking.

One end of the coil 9 of the starter relay 7 is connected to an STA (starter) positive terminal 11 of the ECU 101, wherein the STA positive terminal 11 is configured to allow a current to flow out to the coil 9 from the ECU 101. The other end of the coil 9 is connected to an STA negative terminal 13 of the ECU 101, wherein the STA negative terminal 13 is configured such that a current from the coil 9 is pulled into the ECU 101.

The ECU 101 is provided with a microcomputer 15 operative to execute various tasks to control the engine. The ECU 101 is provided with a diode 17 for avoiding wrap around, whose cathode is connected to the STA positive terminal 11.

The ECU 101 is provided with a high-side transistor 21 consisting of, for example, a P-channel MOS FET. The drain of the high-side transistor 21 is connected to the anode of the diode 17, and the source thereof is connected to an ignition power line 19 located inside the ECU 101.

The ECU 101 is composed of a diode 25 for absorbing fly-back energy, whose anode is connected to a ground line 23 inside the ECU 101 and the cathode is connected to the STA positive terminal 11. The ECU 101 is composed of an inverter 27 connected to the microcomputer 15 and the gate of the high-side transistor 21.

The inverter 27 is operative to apply a battery voltage, such as a voltage of the positive electrode of the battery 5, to the gate of the high-side transistor 21 to turn it off when a drive signal SdH supplied from the microcomputer 15 has a low level. In addition, the inverter 27 is operative to cause the voltage of the gate of the high-side transistor 21 to be substantially 0 V when the drive signal SdH has a high level.

The ECU 101 is composed of a low-side transistor 31 consisting of, for example, an N-channel MOS FET. The drain of the low-side transistor 31 is connected to the STA negative terminal 13, and the source thereof is connected to the ground line 23 inside the ECU 101.

The ECU 101 is configured such that a drive signal SdL for driving the low-side transistor 31 supplied from the microcomputer 15 is applied to the gate of the low-side transistor 31. This permits the low-side transistor 31 to be in on state during the drive signal SdL with the high level, and to be in off during the drive signal SdL with the low level.

The ignition power line 19 is connected to the positive terminal of the battery 5 through a vehicle's ignition switch 29 while the ignition switch 29 is in the ON position, so that the battery voltage is applied to the ignition power line 19. The ground line 23 is constantly connected to the negative terminal of the battery 5. Incidentally, reference characters ⊚ represent terminals including the STA positive and negative terminals 11 and 13 of the ECU 101, respectively.

In the ECU 101, turning on of the ignition switch 29 allows a power supply circuit (not shown) to apply a constant operating voltage to the microcomputer 15, so that the microcomputer 15 initiates operations. After engine-starting requirements have been established, such as, a starter switch (not shown) has been in on state, the microcomputer 15 sets the drive signals SdH and SdL to the high levels, respectively, turning on both the high-side transistor 21 and the low-side transistor 31.

The on of the high-side transistor 21 allows the ignition power line 19 to electrically communicate with the STA positive terminal 11 through the high-side transistor 21. Similarly, the on of the low-side transistor 31 allows the ground line 23 to electrically communicate with the STA negative terminal 13 through the low-side transistor 31.

These communications allow a current to flow from the positive terminal of the battery 5 through the coil 9 over a path. The path consists of the ignition switch 29, the ignition power line 19, the high-side transistor 21, the diode 17, the STA positive terminal 11, the coil 9, the STA negative terminal 13, the low-side transistor 31, the ground line 23, and the negative terminal of the battery 5. The current flowing through the coil 9 causes the starter relay 7 to turn on, making the starter motor 3 activate. The activation of the starter motor 3 causes the engine to start.

In the ECU 101, even if a fault wherein the STA positive terminal 11 is short-circuited to the battery voltage occurs, turning off of the low-side transistor 31 connected to the negative terminal 13 in normal operations can prevent the current from flowing into the coil 9. Similarly, even if a fault wherein the STA negative terminal 13 is short-circuited to the ground voltage occurs, turning off of the high-side transistor 21 connected to the positive terminal 11 in normal can prevent the current from flowing into the coil 9. This allows energization and non-energization of the coil 9, in other words, the on and off of the starter relay 7 to be controlled, as in the case under normal operating conditions of the ECU 101.

In addition, even if an on-fault wherein one of the high-side and low-side transistors 21 and 31 is in constantly on state occurs, turning on and off of the other of the high-side and low-side transistors 21 and 31 can control energization and non-energization of the coil 9. The configuration of the ECU 101 having both the high-side and low-side transistors makes it possible to improve its responsibility than the configuration with either a high-side switching member or a low-side switching member.

Moreover, in order to carry out fault diagnosis of the drive circuit (ECU 101) for driving the starter relay 7, a pull-up resistor 33 and a pull-down resistor 35 are provided in the ECU 101. The pull-up resistor 33 is positioned to connect between the ignition power line 19 and a current path over between the STA positive terminal 11 and the high-side transistor 21. Especially, in FIG. 4, the current path is between the drain of the high-side transistor 21 and the anode of the diode 17.

The pull-down resistor 35 is positioned to connect between the ground line 23 and a current path over between the STA negative terminal 13 and the drain of the low-side transistor 31, Each of the pull-up and pull-down resistors 33 and 35 has a sufficiently high resistance ranging between a few kilo ohms (kΩ) and several tens of kilo ohms (kΩ) so as to prevent a current from flowing through the resistors 33 and 35 while the transistors 21 and 31 are in off.

In addition, the ECU 101 has a first level determining circuit 37. The first level determining circuit 37 is configured to convert a drain voltage VmH of the high-side transistor 21 into a binary signal with high and low levels depending on whether the drain voltage VjH is higher than a predetermined determination voltage VjH. The first level determining circuit 37 is operative to feed the binary signal to the microcomputer 15 as a high-side monitor signal SmH through a signal line L1.

Similarly, the ECU 101 has a second level determining circuit 39. The second level determining circuit 39 is configured to convert a drain voltage VmL of the low-side transistor 31 into a binary signal with high and low levels depending on whether the drain voltage VmL is higher than a predetermined determination voltage VjL. The second level determining circuit 39 is operative to feed the binary signal to the microcomputer 15 as a low-side monitor signal SmL through a signal line L2.

Here, the resistance of the resistor 33 is represented as R33, the resistance of the resistor 35 is represented as R35, the battery voltage is represented as Vbat, and the forward voltage of the diode 17 is represented as Vf. In addition, let us suppose that the resistance of the coil 9 is vanishingly smaller than those of the resistors 33 and 35 For example, the resistance of the coil 9 is approximately several hundred times less than each resistance of each of the resistors 33 and 35.

When the ignition switch 29 is in the ON position and each of the transistors 21 and 31 is in off state, a value of the voltage VmH of the drain of the high-side transistor 21, which is referred to as VmHof, and that of the drain of the low-side transistor 31, which is referred to as VmLof, are represented as the following equations:

$$VmHof=(Vbat-Vf)\times R35/(R33+R35)+Vf \quad (1)$$

$$VmLof=(Vbat-Vf)\times R35/(R33+R35) \quad (2)$$

The determination voltage VjH is higher than the forward voltage Vf and lower than the value VmHof for the situations where the battery voltage Vbat is the minimum value in design, for example, 8 [V]; in other words, the determination voltage VjH is lower than the minimum value of the VmHof. When the drain voltage VmH of the high-side transistor 21 is higher than the determination voltage VjH, the first level determining circuit 37 determines that the drain voltage VmH of the high-side transistor 21 is high, setting the high-side monitor signal SmH inputted to the microcomputer 15 to the high level.

On the contrary, when the drain voltage VmH of the high-side transistor 21 is equal to or lower than the determination voltage VjH, the first level determining circuit 37 determines that the drain voltage VmH of the high-side transistor 21 is low, setting the high-side monitor signal SmH inputted to the microcomputer 15 to the low level.

Similarly, the determination voltage VjL is higher than 0 [V] and lower than the value VmLof for the situations where the battery voltage Vbat is the minimum value in design; in other words, the determination voltage VjL is lower than the minimum value of the VmLof. When the drain voltage VmL of the low-side transistor 31 is higher than the determination voltage VjL, the second level determining circuit 39 determines that the drain voltage VmL of the low-side transistor 31 is high, setting the low-side monitor signal SmL inputted to the microcomputer 15 to the high level.

On the contrary, when the drain voltage VmL of the low-side transistor 31 is equal to or lower than the determination voltage VjL, the second level determining circuit 39 determines that the drain voltage VmL of the low-side transistor 31 is low, setting the low-side monitor signal SmL inputted to the microcomputer 15 to the low level. Incidentally, each of the determination voltages VjH and VjL of the level determining circuit 37 and 39 can have hysteresis characteristics, respectively.

The relationship between failure modes in the circuit for driving the starter relay 7 and each level of each of the monitor signals SmH and SmL when the ignition switch 29 is in the ON position and each of the high-side and low-side transistors 21 and 31 is in off state is represented as the following table 1.

TABLE 1

| | NORMAL/FAILURE MODE | | | | | | | | |
|---|---|---|---|---|---|---|---|---|---|
| | [1] NORMAL | [2] STA + TERMINAL BATTERY SHORT | [3] STA − TERMINAL BATTERY SHORT | [4] STA + TERMINAL GROUND SHORT | [5] STA − TERMINAL GROUND SHORT | [6] STA + TERMINAL OPEN | [7] STA − TERMINAL OPEN | [8] HIGH-SIDE TRAN-SISTOR ON-FAULT | [9] LOW-SIDE TRAN-SISTOR ON-FAULT |
| SmH (VmH) | H | H | H | L | L | H | H | H | L |
| SmL (VmL) | H | H | H | L | L | L | L | H | L |
| STARTER CONTROL | POSSIBLE | POSSIBLE | IMPOSSIBLE | IMPOSSIBLE | POSSIBLE | IMPOS-SIBLE | IMPOS-SIBLE | POSSIBLE | POSSIBLE |

In the table 1, reference character "H" represents the high level, and reference character "L" represents the low level. In addition, in the table 1 and the following descriptions, the phrase "STA+terminal battery short" in the failure mode [2] represents a failure wherein the STA positive terminal 11 is short-circuited to the battery voltage. Similarly, the phrase "STA−terminal battery short" in the failure mode [3] represents a failure wherein the STA negative terminal 13 is short-circuited to the battery voltage.

In addition, the phrase "STA+terminal ground short" in the failure mode [4] represents a failure wherein the STA positive terminal 11 is short-circuited to the ground voltage. Similarly, the phrase "STA−terminal ground short" in the failure mode [5] represents a failure wherein the STA negative terminal 13 is short-circuited to the ground voltage.

Furthermore, the phrase "STA+terminal open" in the failure mode [6] represents an open circuit of the STA positive terminal 11 due to, for example, disconnection between the STA positive terminal 11 and the coil 9, a break in the coil 9, or the like. Similarly, the phrase "STA−terminal open" in the failure mode [7] represents an open circuit of the STA negative terminal 13 due to, for example, disconnection between the STA negative terminal 13 and the coil 9, a break in the coil 9, or the like.

Still furthermore, the phrase "high-side transistor on-fault" in the failure mode [8] represents a fault wherein the high-side transistor 21 is in constantly on state, and the phrase "low-side transistor on-fault" in the failure node [9] represents a fault wherein the low-side transistor 31 is in constantly on state.

In contrast, the normal mode [1] represents a normal condition of the ECU 101 for the starter relay 7 with no failures in the failure modes [2] to [9]

The character "possible" in the bottom raw of the table 1 represents that it is possible for the ECU 101 to control the starter motor 3, that is, to execute on and off control of the starter relay 7. In addition, the character "impossible" in the bottom raw of the table 1 represents that it is impossible for the ECU 101 to control the starter motor 3, that is, to execute on/off control of the starter relay 7.

Specifically, when the ignition switch 29 is in the ON position and each of the transistors 21 and 31 is in off state, the microcomputer 15 reads the levels of the high-side monitor signal SmH and the low-side monitor signal SmL. Based on the read levels of the high-side and low-side monitor signals SmH and SmL, the microcomputer 15 detects any one of the failures in the failure modes [2] to [9].

For example, when the level of the high-side monitor signal SmH is high and that of the low-side monitor signal SmL is low, the microcomputer 15 determines that any one of the failure "STA+terminal open" in the failure mode [6] or the failure "STA−terminal open" in the failure mode [7] occurs.

Similarly, when the engine does not start even in a case of turning the transistors 21 and 31 on, and both the levels of the high-side and low-side monitor signals SmH and SmL are low, the microcomputer 15 determines that any one of the failure "STA+terminal ground short" in the failure mode [4] occurs.

In the ECU 101 set forth above, however, as shown in the modes [1], [2] and [8], the level of the high-side monitor signal SmH is the same as that of the low-side monitor signal SmL in either case when the ECU 101 normally operates in the normal mode [1] or when any one of the failure "STA+ terminal battery short" in the failure mode [2] and the failure "high-side transistor on-fault" in the failure mode [8] has occurred In addition, even if any one of the failure "STA+ terminal battery short" in the failure mode [2] and that "high-side transistor on-fault" in the failure mode [8] occurs, the on/off control of the starter relay 7 can be executed based on the on/off control of the low-side transistor 31.

This may cause a difficulty to detect an occurrence of any one of the failure "STA+terminal battery short" in the failure mode [2] and that "high-side transistor on-fault" in the failure mode [8]. As a result, there is a possibility that a user, such as a driver, has continued to use a vehicle in which the circuit shown in FIG. 4 is installed after an occurrence of any one of the failure "STA+terminal battery short" in the failure mode [2] and that "high-side transistor on-fault" in the failure mode [8].

Incidentally, as shown in the failure mode [3] of the table 1, an occurrence of the failure "STA−terminal battery short" makes the levels of the monitor signals SmH and SmL equal to each other. In this case, however, it is difficult to turn the starter relay 7 on so that the engine does not start, this situation allows detection and identification of the failure "STA−terminal battery short".

SUMMARY OF THE INVENTION

The present invention has been made so that at least one preferable embodiment of the present invention provides a starter-relay control circuit capable of detecting more failure modes. Specifically, at least one preferable embodiment of the present invention provides a starter-relay control circuit capable of distinctively detecting the failure mode "STA+ terminal battery short" and that "high-side transistor on-fault".

According to one aspect of the present invention, there is provided a starter-relay control circuit for a vehicle. The vehicle includes a starter relay, a starter motor connected to the starter relay and rotatable based on an operation of the starter relay, a battery and an ignition switch connected to a positive terminal of the battery. The starter-relay control circuit has a high-side terminal connected to one end of a coil of the starter relay, and a low-side terminal connected to the other end of the coil. The starter-relay control circuit has a high-side switching element connected between a first output line connected to the high-side terminal and an ignition power line connected to the ignition switch, and a low-side switching element connected between a second output line connected to the low-side terminal and a ground line connected to a negative terminal of the battery. The starter-relay control circuit has a pull-up element connected between the ignition power line and the fast output line, and a pull-down element connected between the ground line and the second output line. The starter-relay control circuit has a failure detecting unit connected to the first and second output lines and configured to determine whether a failure wherein the high-side terminal is short-circuited to the positive terminal of the battery occurs based on a voltage of the second output line when the ignition switch is in an off position.

According to another aspect of the present invention, there is provided a starter-relay control circuit for a vehicle. The vehicle includes a starter relay, a starter motor connected to the starter relay and rotatable based on an operation of the starter relay, a battery and an ignition switch connected to a positive terminal of the battery. The starter-relay control circuit comprises a high-side terminal connected to one end of a coil of the starter relay, and a low-side terminal connected to the other end of the coil. The starter-relay control circuit comprises a high-side switching element having a control terminal and connected between a first output Line connected to the high-side terminal and an ignition power line connected to the ignition switch. The starter-relay control circuit comprises a low-side switching element having a control terminal and connected between a second output line connected to the low-side terminal and a ground line connected to a negative terminal of the battery. The starter-relay control circuit comprises a pull-up element connected between the ignition power line and the first output line, and a pull-down element connected between the ground line and the second output line, and a failure detecting unit connected to the first and second output lines, the control terminal of the high-side switching element. The starter-relay control circuit comprises a failure detecting unit connected to the first and second output lines, the control terminal of the high-side switching element, and the control terminal of the low-side switching element The failure detecting unit is configured to turn, in response to a turning on of the ignition switch, the second switching element on with the first switching element kept off to determine whether the starter motor rotates; and detect any one of a first failure wherein the high-side terminal is short-circuited to the positive terminal of the battery and a second failure wherein the first switching element is constantly in on state occurs when it is determined that the starter motor rotates.

According to a further aspect of the present invention, there is provided a starter-relay control circuit for a vehicle. The vehicle includes a starter relay, a starter motor connected to the starter relay and rotatable based on an operation of the starter relay, a battery and an ignition switch connected to a positive terminal of the battery. The starter-relay control circuit comprises a high-side terminal connected to one end of a coil of the starter relay, a low-side terminal connected to the other end of the coil, a high-side switching element having a control terminal and connected between a first output line connected to the high-side terminal and an ignition power line connected to the ignition switch. The starter-relay control circuit comprises a low-side switching element having a control terminal and connected between a second output line connected to the low-side terminal and a ground line connected to a negative terminal of the battery. The starter-relay control circuit comprises a pull-up element connected between the ignition power line and the first output line, and a pull-down element connected between the ground line and the second output line. The starter-relay control circuit has a failure detecting unit connected to the first and second output lines, the control terminal of the high-side switching element, and the control terminal of the low-side switching element. The failure detecting unit is configured to turn the first and second switching elements on to determine whether the starter motor rotates. The failure detecting unit is configured to turn the first switching element off with the second switching element kept on when it is determined that the starter motor rotates, and to read a level of a first monitor signal through the first output line and a level of a second monitor signal through the second output line. The failure detecting unit is configured to detect any one of a first failure wherein the high-side terminal is short-circuited to the positive terminal of the battery and a second failure wherein the first switching element is constantly in on state occurs based on the read levels of the first and second monitor signals.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings. In each embodiment, an electronic control unit (ECU) is installed in a vehicle and serves as an engine control unit operative to control an entire engine of the vehicle. Especially, in each embodiment, descriptions are focused on engine-starting control operations of the ECU.

First Embodiment

Figure 1:
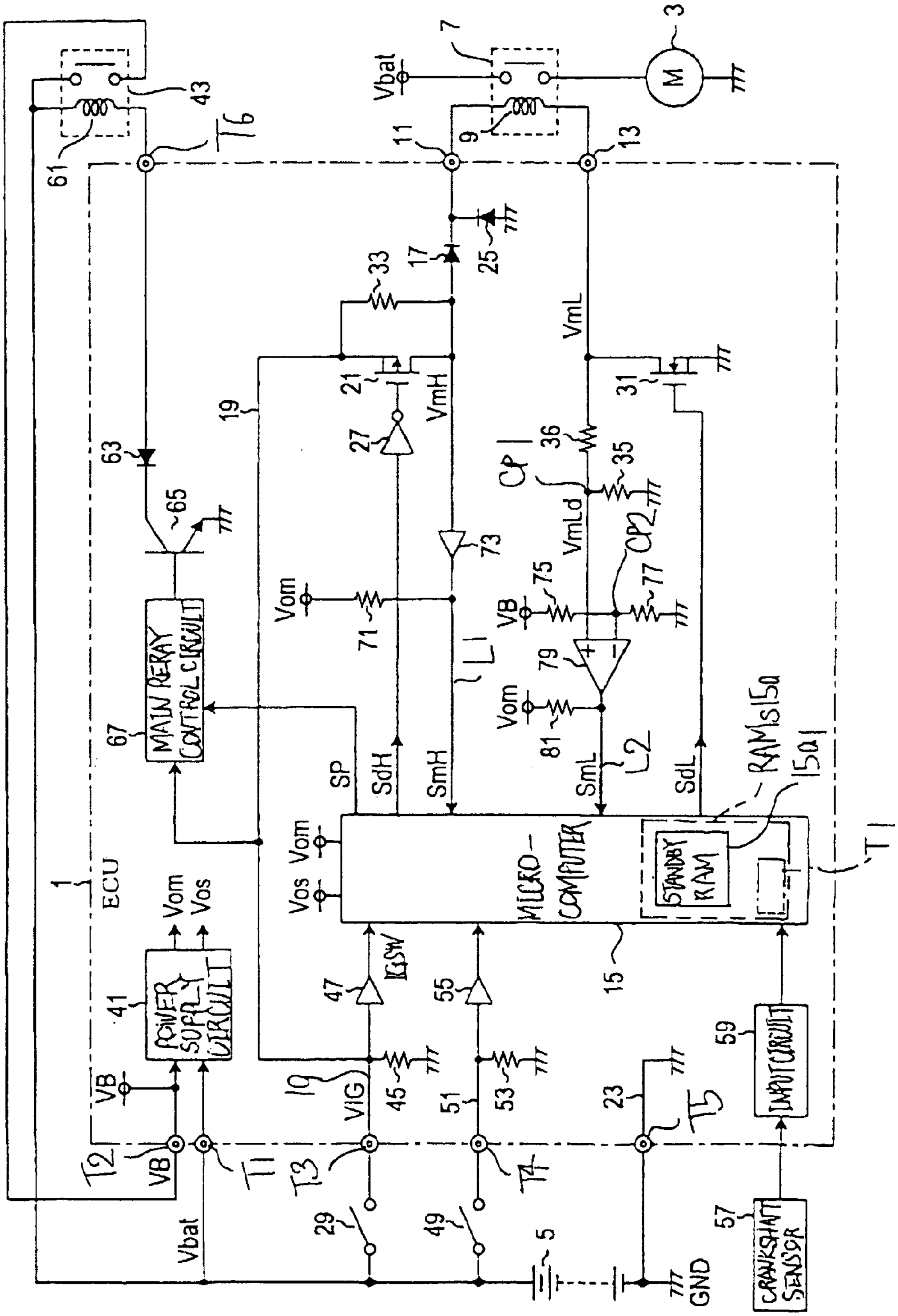
FIG. 1 is a circuit diagram of a starter-relay control circuit according to a first embodiment of the present invention.
Figure 4:
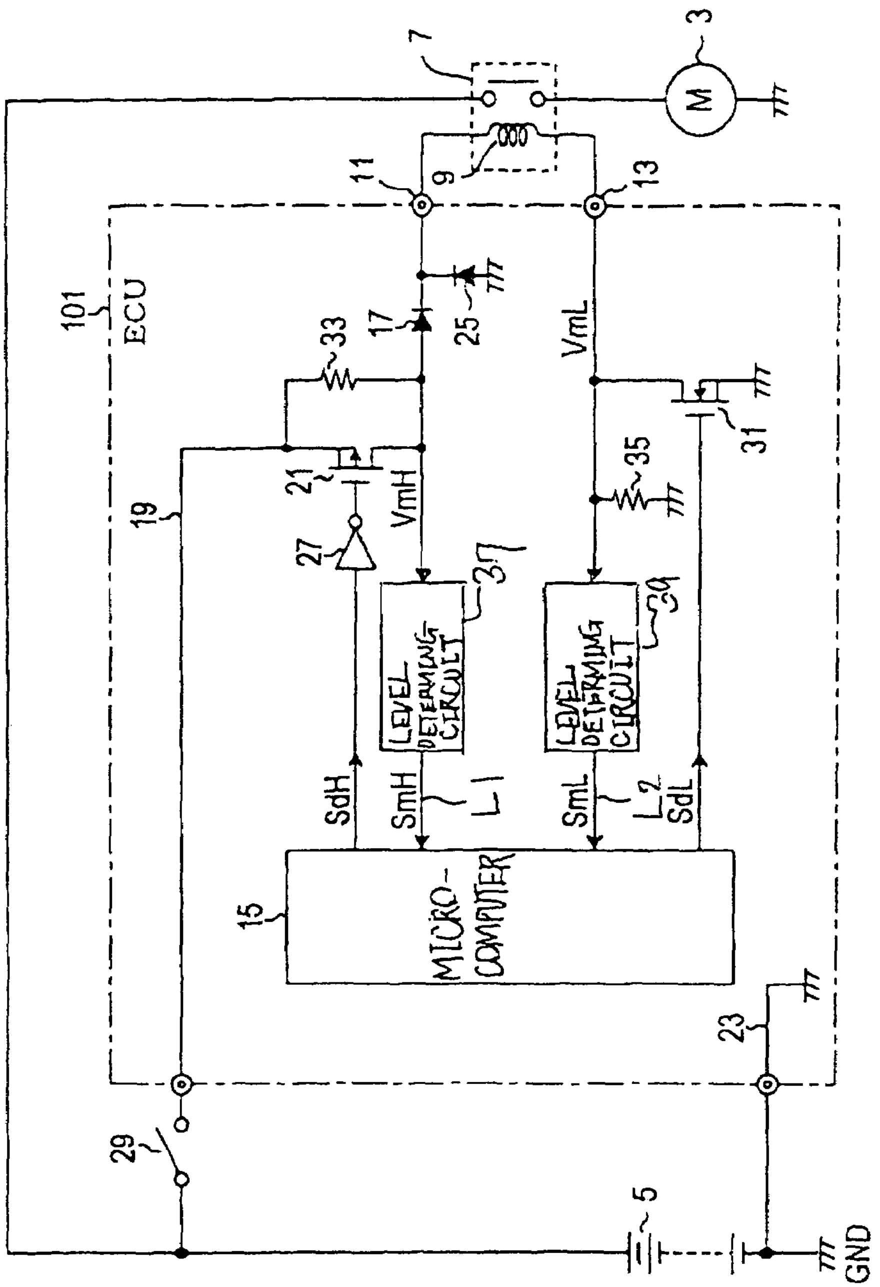
FIG. 4 is a circuit diagram of a starter-relay control circuit with an ECU according to a related art of the present invention.

FIG. 1 is a circuit diagram of an ECU as a starter-relay control circuit according to a first embodiment of the present invention. Incidentally, some elements and signals illustrated in FIG. 1, which are substantially identical with those illustrated in FIG. 4, are marked with the same reference characters of the corresponding elements and signals illustrated in FIG. 4. Descriptions of some elements and signals illustrated in FIG. 1, which are marked with the same reference characters of the corresponding elements and signals illustrated in FIG. 4, are therefore omitted or simplified.

As illustrated in FIG. 1, the negative terminal of a starter motor 3 of the engine is constantly connected to a ground electrode (GND) whose potential is 0 [V] at the exterior of an ECU 1 according to the first embodiment of the present invention. The potential of the ground electrode corresponds to that of the negative electrode of a battery 5. The positive terminal of the starter motor 3 is connected to the positive electrode of the battery 5 through a pair of contacts of the starter relay 7, A current flowing through the coil 9 of the starter relay 7 allows the starter relay 7 to be turned on, in other words, the paired contacts of the starter relay 7 to be short-circuited to each other. The on state of the starter relay 7 allows power to be supplied from the battery 5 to the starter motor 3 to activate it, causing an engine to be cranking.

One end of the coil 9 of the starter relay 7 is connected to an STA positive terminal 11 of the ECU 1, wherein the STA positive terminal 11 is configured to allow a current to flow out to the coil 9 from the ECU 1. The other end of the coil 9 is connected to an STA negative terminal 13 of the ECU 1, wherein the STA negative terminal 13 is so configured that a current from the coil 9 can be pulled into the ECU 1.

The ECU 1 is provided with a microcomputer 15 composed of, for example, CPU, RAMs (Random Access Memories) 15*a* each to which the CPU is accessible, an input/output (10) interface, and the like. The RAMs 15*a* include at least one standby RAM 15*a*1 for storing therein data to be continuously held. The microcomputer 13 is operative to execute various tasks to control the engine.

In the first embodiment, first table data T1 indicative of the table 1 is previously stored in one of the RAMs 15*a*.

The ECU 1 is also provided with a diode 17, an ignition power line 19, a high-side transistor 21, a diode 25, an inverter 27, a low-side transistor 31, a pull-up resistor 33, and a pull-down resistor 35, which are substantially the same as the above elements illustrated in FIG. 4.

In addition to the elements, the ECU 1 is provided with a power supply circuit 41.

The power supply circuit 41 is connected to the positive terminal of the battery 5 through a terminal T1 of the ECU 1. The power supply circuit 41 is also connected through a terminal T2 to a main relay 43 for power feeding located at the exterior of the ECU 1. The power supply circuit 41 is configured such that a battery voltage Vbat at the positive terminal of the battery 5 is constantly supplied thereto. The power supply circuit 41 is configured to constantly generate a sub supply voltage Vos of, such as 3.3 [V], thereby supplying the sub supply voltage to the microcomputer 15. The sub supply voltage Vos is used to hold data stored in the standby RAM 15*a*1.

When the ignition switch 29 is in the ON positon, or a power supply holding signal, such as a voltage signal, SP outputted from the microcomputer 15 has a high level of, for example, 5 [V], the battery voltage Vbat is configured to be supplied to the power supply circuit 41 through the main relay 43 and a terminal T2 of the ECU 1. Hereinafter, the battery voltage supplied from the positive terminal of the battery 5 to the power supply circuit 41 through the main relay 43 and the terminal T2 is referred to as "battery voltage VB".

In contrast, the battery voltage supplied from the positive terminal of the battery 5 to the power supply circuit 41 through the terminal Ti without passing the main relay 43, that is, the voltage of the positive terminal of the battery 5 itself is referred to as "battery voltage Vbat". The power supply circuit 41 is configured to generate a main supply voltage Vom of, for example, 5 [V], based on the battery voltage VB, thereby outputting the main supply voltage Vom to the microcomputer 15.

The power supply circuit 41 has a power-on reset function for outputting a reset signal to the microcomputer 15 for a very short period of time at the start of the output of the main supply voltage Vom; this very short period of time allows the main supply voltage Vom to be stabilized. Specifically, after no reset signal is supplied to the microcomputer 15, in other words, after the main supply voltage Vom is stabilized, the microcomputer 15 is configured to boot up from its initial state to start operating based on the main supply voltage Vom stabilized.

Moreover, the ECU 1 is provided with a pull-down resistor 45 and a first input circuit 47.

The pull-down resistor 45 is connected between the ground line 23 and the ignition power line 19 connected to the positive terminal of the battery 5 through the ignition switch 29. The pull-down resistor 45 is configured to pull down the ignition line 19 to the ground voltage. The first input circuit 47 is connected between a point on the ignition line 19 at which the pull-down resistor 45 is connected and the microcomputer 15 The first input circuit 47 is configured to convert a voltage VIG of the ignition power line 19 into an IGSW (ignition switch) signal whose high level is 5 [V] and low level is 0 [V], thereby entering the IGSW signal into the microcomputer 15. Specifically, the pull-down resistor 45 allows the IGSW signal to be in on state while the ignition switch 29 is in the OFF position, and it to be in off state while the ignition switch 29 is in the ON position.

Furthermore, the ECU I is provided with a signal line 51, a pull-down resistor 53, and a second input circuit 55.

The signal line 51 is connected between a terminal T4 of the ECU 1 and the microcomputer 15. Specifically, the signal line 51 is connected to the positive terminal of the battery 5 through the terminal T4 and a starter switch 49. A driver of the vehicle can operate the starter switch 49 to turn it on when starting the engine The pull-down resistor 53 is connected between the ground line 23 and the signal line 51. The second input circuit 55 is configured to convert a voltage of the signal line 51 into a starter switch signal 23 whose high level is 5 [V] and low level is 0 [V], thereby entering the starter switch signal into the microcomputer 15.

Specifically, the pull-down resistor 53 allows the starter switch signal to be in on state while the starter switch 49 is in the OFF position, and it to be in off state while the starter switch 49 is in the ON position.

The ECU 1 is provided with a third input circuit 59, The third input circuit 59 is configured to receive a rotation pulse signal whose pulse interval, for example, depends on a rotation angle of a crankshaft of the engine; this rotation pulse signal is fed from a crankshaft sensor 57. The third input circuit 59 is configured to shape the waveform of the rotation pulse signal to enter it into the microcomputer 15. Incidentally, the ground line 23 inside the ECU 1 is connected to the ground electrode (GND) whose potential is 0 M through a terminal T5.

In addition, the ECU 1 is provided with a main relay on/off control unit composed of a diode 63, an NPN transistor 65, and a main relay control circuit 67.

The main relay 43 has a coil 61 whose one end is connected to the positive terminal of the battery 5; the other end of the coil 61 is connected to the anode of the diode 63 through a terminal T6. The cathode of the diode 63 is connected to the collector of the NPN transistor 65 whose emitter is connected to the ground line 23. An on state of the NPN transistor 65 allows a current to flow through the coil 61 of the main relay 43, The main relay control circuit 67 is connected to the base of the NPN transistor 65, the ignition power line 19, and the microcomputer 15. The main relay control circuit 67 is configured to turn the NPN transistor 65 on when the voltage VIG of the ignition power line 19 becomes the battery voltage Vbat or the power supply holding signal SP supplied from the microcomputer 15 to the main relay control circuit 67 varies to the high level. The on-state of the NPN transistor 65 allows the current to flow through the coil 61, which causes the main relay 43 to turn on, in other words, which causes a pair of contacts of the main relay 43 to be short-circuited to each other.

The above configuration allows the main relay 43 to be kept on while the ignition switch 29 is in the on position or the power supply holding signal SP is in the high level. The on-state of the main relay 43 allows the battery voltage VB to be supplied to the power supply circuit 41, permitting the power supply circuit 41 to output the main supply voltage Vom to the microcomputer 15. Incidentally, the diode 63 is provided for preventing a reverse voltage from being applied to the transistor 65 when the battery 5 is connected such that the polarity of the battery 5 is reversed.

In addition, the ECU 1 is provided with a resistor 36 connected between the drain of the low-side transistor 31 and one end of the resistor 35 whose other end is connected to the ground line 23 through a connection point CP1. The resistors 35 and 36 serve as a pull-down resistor that pulls down the current path over between the STA negative terminal 13 and the drain of the low-side transistor 31 to the ground line 23. In addition, the resistors 35 and 36 serve as a voltage divider that divides the drain voltage VmL of the low-side transistor 31.

Moreover, the ECU 1 is provided with a resistor 71 to which the main supply voltage Vom is applied. The ECU 1 is provided with a Schmitt trigger buffer circuit 73 whose output terminal is connected to the microcomputer 15 through the signal line L1 through which a high-side monitor signal SmH is sent to the microcomputer 15. The resistor 71 is connected to the signal line L1 and configured to pull up the signal line L1 to the main supply voltage Vom.

The Schmitt trigger (hysteresis) buffer circuit 73 is connected to the drain of the high-side transistor 21 and configured to place the output terminal into a high-impedance state when the drain voltage VmH of the high-side transistor 21 is equal to or higher than a constant high-level determining voltage value Va.

When the drain voltage VmH of the high-side transistor 21 is lower than a constant low-level determining voltage value Vb, which is lower than the voltage value Va, the Schmitt trigger buffer circuit 73 is configured to conduct the output terminal to the ground line 23.

When the equation "the drain voltage VmH≧the voltage value Va" holds, the high-side monitor signal SmH supplied to the microcomputer 15 becomes the high level corresponding to the main supply voltage Vom. In contrast, when the equation "the drain voltage VmH≦the voltage value Vb" holds, the high-side monitor signal SmH supplied to the microcomputer 15 becomes the low level corresponding to 0 [V].

Specifically, the ECU 1 determines that the drain voltage VmH of the high-side transistor 21, which corresponds to a voltage in an STA positive terminal side current flow path through the coil 9, is high when the equation "VmH≧Va>Vb" holds. In contrast, the ECU 1 determines that the drain voltage VmH of the high-side transistor 21 is low when the equation "VmH≦Vb<Va" holds.

Still furthermore, the ECU 1 is provided with a pair of resistors 75 and 77 for voltage division. One end of the resistor 75 and that of the resistor 77 are serially connected to each other through a connection point CP2. The battery voltage VB is configured to be supplied to the other end of the resistor 75 and the other of the resistor 77 is connected to the ground line 23. The resistances of the resistors 75 and 77 are equal to each other, which allow the resistors 75 and 77 to divide the battery voltage VB into "VB/2".

The ECU 1 is also provided with a comparator 79 having an output terminal, a noninverting input terminal (positive terminal) and an inverting input terminal (negative terminal). The output terminal of the comparator 79 is connected through the signal line L2 to the microcomputer 15. The inverting terminal of the comparator 79 is connected to the connection point CP2, allowing the divided voltage "VB2" to be applied to the inverting terminal of the comparator 79 as a determination voltage.

The noninverting terminal of the comparator 79 is connected to the connection point CP1 between the resistors 35 and 36, allowing a voltage VmLd developed at the connection point CP1 to be applied to the noninverting terminal of the comparator 79.

Moreover, the ECU 1 is provided with a resistor 81 to which the main supply voltage Vom is applied, and the resistor 81 is connected to the signal line L2. The resistor 81 is configured to pull up the output terminal of the comparator 79 to the main supply voltage Vom. Incidentally, the output terminal of the comparator 79 is an open collector type terminal or an open drain type terminal.

The voltage of the output terminal of the comparator 79 is configured to be inputted to the microcomputer 15 as a low-side monitor signal SmL.

When the equation "the voltage VmLd>VB/2" holds, the low-side monitor signal SmL supplied to the microcomputer 15 becomes the high level, that is the main supply voltage Vom. In contrast, when the equation "the voltage VmLd≦VB/2" holds, the low-side monitor signal SmL supplied to the microcomputer 15 becomes the low level, that is 0 [V].

Incidentally, in the first embodiment, when the resistance of the resistor 35 is represented as R35, and the resistance of the resistor 36 is represented as R36, the following equation "VmLd=VmL×R35/R35+R36)" holds. In the ECU 1 according to the first embodiment, therefore, the voltage VmL, which corresponds to a voltage in an STA negative terminal side current flow path through the coil 9, is high when the equation "VmLd>VB×(R35+R36)/(2×R35)" holds, and is low when the equation "VmLd≦VB×(R35+R36)/(2×R35)" holds.

In the first embodiment, the resistance of the starter relay coil 9 is within the range between several tens of ohms and several hundreds of ohms or thereabout; this resistance is vanishingly smaller than the resistances R33, R35, and R36 of the resistors 33, 35, and 36.

Hence, when the ignition switch 29 is in the ON position and each of the transistors 21 and 31 is in off state, a value VmHof of the voltage VmH of the drain of the high-side transistor 21, a value VmLof of the voltage VmL, and a value VmLdof of the voltage VmLd are represented as the following equations:

$$VmHof = (Vbat - Vf) \times (R35 + R36) / (R33 + R35 + R36) + Vf \quad (3)$$

$$VmLof = (Vbat - Vf) \times (R35 + R36) / (R33 + R35 + R36) \quad (4)$$

$$\begin{aligned} VmLdof &= VmLof \times R35 / (R35 + R36) \\ &= (Vbat - Vf) \times R35 / (R33 + R35 + R36) \end{aligned} \quad (5)$$

In the first embodiment, for example, the resistances R33 of the resistor 33 is set to 5.1 kΩ, the resistance R35 of the resistor 35 is set to 47 kΩ, and the resistance R36 of the resistor 36 is set to 10 kΩ.

Let us suppose that the minimum value of the battery voltage Vbat in design is, for example, 8 [V], and the forward voltage Vf of the diode 17 is set to 0.7 [V]. In this supposition, the equations (3) to (5) provide that the voltage value VmHof is equal to 7.4 [V], the voltage value VmLof is equal to 6.7 [V], and the voltage value VmLdof is equal to 5.5 [V].

In addition, in the first embodiment, the high-level determination value Va is set to be smaller than the voltage value VmHof when the minimum value of the battery voltage Vbat in design is 8 [V]. For example, the high-level determination value Va is set to 4 [V].

Moreover, when any one of the failure "STA+terminal ground short", the failure "STA−terminal ground short", and the failure "low-side transistor on-fault" occurs, the voltage VmH does not become the normal value of the VmHof represented by the equation (3), but drops up to the forward voltage Vf (=0.7 [V]) of the diode 17. The low-level determining voltage Vb, however, is higher than the forward voltage Vf; this low-level determining voltage Vb is set to, for example, 1.5 [V].

When the ignition switch 29 is in the ON position and each of the transistors 21 and 31 is in off state, any one of the failures "STA+terminal battery short", "STA−terminal battery short", "STA+terminal open", "STA−terminal open", and "high-side transistor on-fault" occurs. This causes the voltage VmH to be equal to or higher than the normal value of the VmHof represented by the equation (3).

In addition, the determination voltage (=VB/2) inputted to the noninverting terminal of the comparator 79 is lower than the voltage value VmLdof represented by the equation (5) even if the battery voltage Vbat varies within a normal range between, for example, 8 [V] and 15 [V]. Moreover, when the ignition switch 29 is in the ON position and each of the transistors 21 and 31 is in off state, any one of the failures "STA+terminal ground short", "STA−terminal ground short", "STA+terminal open", "STA−terminal open", and "low-side transistor on-fault" occurs. This causes the determination voltage (=VB/2) to be higher than the value (=0 [V]) of the voltage VmLd. For example, the determination voltage (=VB/2) inputted to the noninverting terminal of the comparator 79 is within a range between 4 [V] and 7.5 [V].

When the ignition switch 29 is in the ON position and each of the transistors 21 and 31 is in off state, any one of the failures "STA+terminal battery short", "STA−terminal battery short", and "high-side transistor on-fault" occurs. This causes the voltage VmLd to be equal to or higher than the normal value of the VmLdof represented by the equation (5).

As described above, the ECU 1 according to the first embodiment has the relationship between the normal/failure modes [1] to [9] and each level of each of the monitor signals SmH and SmL when the ignition switch 29 is in the ON position and each of the high-side and low-side transistors 21 and 31 is in off state. The relationship is represented as the following table 1, which is similar to the ECU 101.

Incidentally, in the ECU 1 according to the first embodiment, the resistor 36 allows the voltage normally inputted to the noninverting input terminal of the comparator 79 to be close to the determination voltage (=VB/2) inputted to the inverting input terminal thereof up to a point.

Specifically, even if the coil 9 is not completely broken, but the resistance of the coil 9 increases up to, for example, 30 kΩ or thereabout, because the voltage normally inputted to the noninverting input terminal of the comparator 79 is close to the determination voltage (−VB/2), the voltage VmLd inputted to the noninverting input terminal of the comparator 79 is lower than the determination voltage (=VB/2). This allows the low-side monitor signal SmL inputted to the microcomputer 15 to become the low level. Because the low-side monitor signal SmL inputted to the microcomputer 15 becomes the low level depending on the increase of the coil 9 in resistance, it is possible to detect the increase of the coil's resistance as the failure "STA+terminal open" in the failure mode [6] or the failure "STA−terminal open" in the failure mode [7].

In place of providing the resistor 36 in the STA negative terminal side current flow path through the coil 9, adjustment of the resistances of the resistors 75 and 76 allows the determination voltage inputted to the noninverting input terminal of the comparator 79 to be higher than the voltage of VB/2. This also makes it possible to detect the increase of the coil's resistance as the failure "STA+terminal open" in the failure mode [6] or the failure "STA−terminal open" in the failure mode [7].

Next, operations of the microcomputer 15 to detect failures in the starter relay drive circuit of the ECU 1 with the starter relay 7 controlled will be described hereinafter in accordance with a flowchart shown in FIG. 2.

Figure 2:
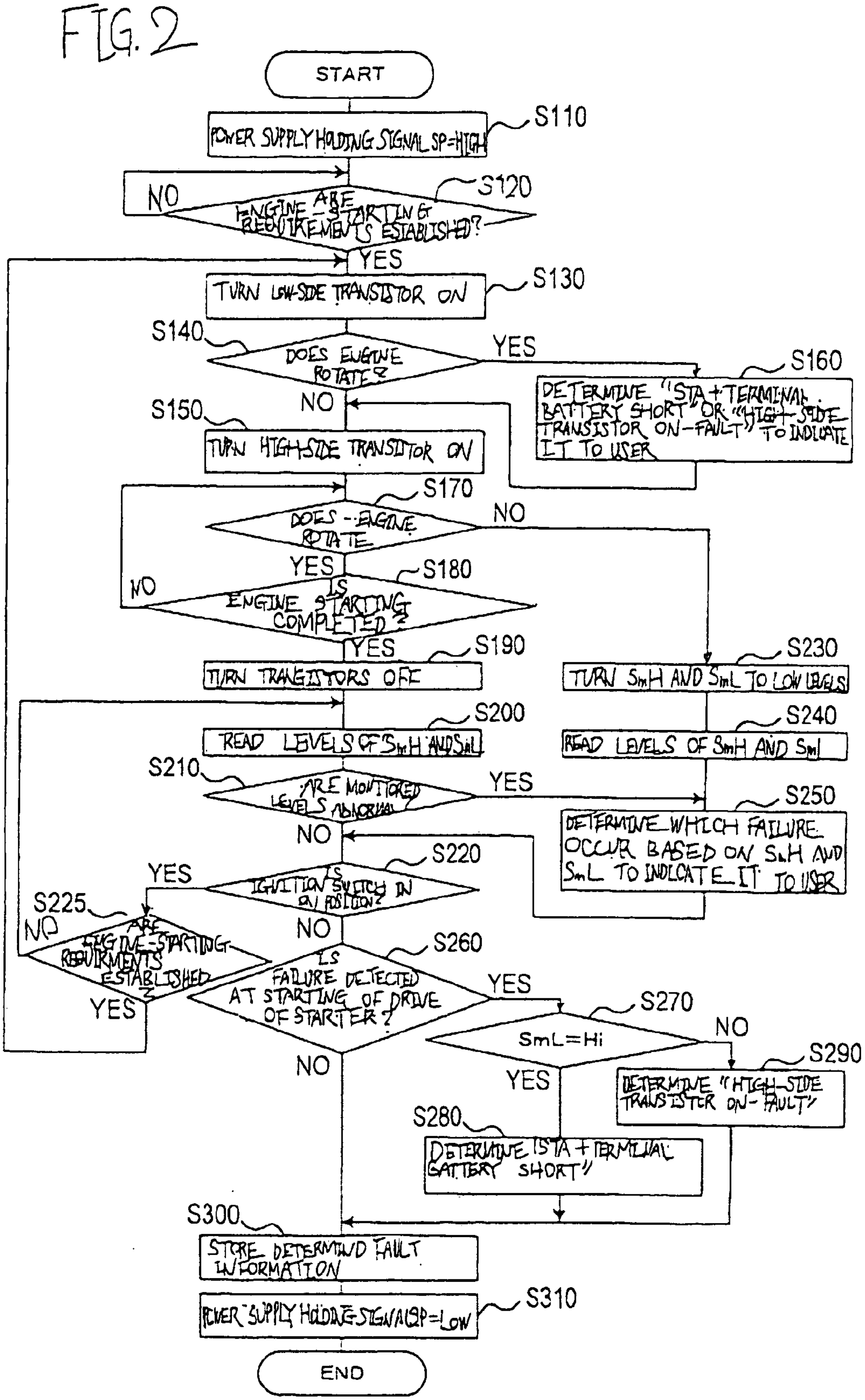
FIG. 2 is a flowchart schematically illustrating operations of a microcomputer according to the first embodiment.

Incidentally, the microcomputer 15 initiates operations to execute a process defined by the sequence of instructions shown in FIG. 2 when receiving the main supply voltage Vom fed from the power supply circuit 41 at the turning on of the main relay 43 in response to the turning on of the ignition switch 29. In addition, when the microcomputer 15 starts up the operations, the initial levels of the drive signals SdH and SdL, and the power supply holding signal SP are set to be the low levels, respectively.

As shown in FIG. 2, when initializing the operations, the microcomputer 15 turns the level of the power supply holding signal SP to the high level in step S1, keeping the main supply voltage Vom supplied from the power supply circuit 41, in other words, the main relay 43 in on state in step S110.

In step S120, the microcomputer 15 waits until engine-starting requirements have been established. For example, as the engine-starting requirements, the microcomputer 15 waits until the starter switch 49 has been turned to the On position and the engine speed has not reached a predetermined speed, which is regarded such that the engine is running.

The on/off state of the starter switch 49 is detected by the microcomputer 15 based on the starter switch signal inputted from the input circuit 55. The engine speed is detected by the microcomputer 15 based on the rotation pulse signal inputted from the crankshaft sensor 57 through the input circuit 59. If the vehicle is equipped with automatic transmission, a requirement such that the position of a gear-shift lever is in the parking position may be added to the engine-starting requirements.

When it is determined that the engine starting requirements have been established based on the starter switch signal, the rotation pulse signal, and so on (the determination in step S120 is YES), the microcomputer 15 proceeds to step S130. In step S130, the microcomputer 15 turns the level of the drive signal SdL to the high level to turn the low-side transistor 31 on. Next, the microcomputer 15 determines whether the engine cranking starts (engine starts to rotate) at the timing of the turning on of the low-side transistor 31. In other words, the microcomputer 15 determines whether the crankshaft of the engine starts to rotate depending on only the turning on of the low-side transistor 31 in step S140.

When it is determined that the engine cranking does not start (the determination in step S140 is NO), the microcomputer 15 proceeds to step S150. In step S150, the microcomputer 15 turns the level of the drive signal SdH to the high level to turn the high-side transistor 21 on. Specifically, at step S150, both the high-side transistor 21 and the low-side transistor 31 are turned on, respectively In step S170, the microcomputer 15 determines whether the engine cranking starts as a similar operation in step S140. When it is determined that the engine cranking starts (the determination in step S170 is YES), the microcomputer 15 determines that the starter relay 7 is turned on, proceeding to step S180. In step S180, the microcomputer 15 determines whether the engine starting is completed. When it is determined that the engine starting is not completed (the determination in step S180 is NO), the microcomputer 15 returns to step S170 to repeatedly execute the operations in steps S140 and thereafter.

In contrast, when it is determined that the engine starting is completed (the determination in step S180 is YES), the microcomputer 15 proceeds to step S190. Incidentally, in step S180, the microcomputer 15 can determine that the engine speed is equal to or higher than a predetermined speed regarded such that the engine completely starts up; this predetermined speed may be an idle speed or a speed slightly lower than the idle speed.

In step S190, the microcomputer 15 turns the levels of the drive signals SdH and SdL to the low levels to turn the high-side transistor 21 and the low-side transistor 31 off, respectively. This causes the starter relay 7 to turn off, so that the engine cranking is stopped.

Subsequently, in step S200, the microcomputer 15 reads the levels of the high-side monitor signal SmH and the low-side monitor signal SmL, and determines whether the read levels of the monitor signals SmH and SmL are abnormal in step S210.

Specifically, because both the high-side transistor 21 and the low-side transistor 31 are in off state, when each of the read levels of the monitor signals SmH and SmL is normal, the levels of the monitor signals SmH and SmL are high levels, respectively (see the normal mode [1] in the table 1).

That is, in step S210, the microcomputer 15 determines that the levels of the monitor signals SmH and SmL are abnormal when at least one of the levels thereof is low-level.

When it is determined that the levels of the monitor signals SmH and SmL are normal, that is, the levels thereof are the high levels, respectively (the determination in step S210 is YES), the microcomputer 15 proceeds to step S220 in step S220, the microcomputer 15 determines whether the ignition switch 29 is in the ON position based on the IGSW signal inputted from the input circuit 47. When it is determined that the ignition switch 29 is in the ON position (the determination in step S220 is YES), the microcomputer 15 proceeds to step S225.

In step S225, the microcomputer 15 waits until the engine-starting requirements have been established as a similar operation in step S120.

When it is determined that the engine starting requirements have not been established (the determination in step S225 is NO), the microcomputer 15 returns to step S200 to execute the operations in step S200 and thereafter.

In contrast, when it is determined that the engine starting requirements have been established (the determination in step S225 is YES), the microcomputer 15 returns to step S130 to execute the operations in step S130 and thereafter for resuming the engine. Incidentally, the microcomputer 15 determines that the engine starting requirements have been established only when engine stall occurs so that the driver tries to restart the engine.

In contrast, in step S170, when it is determined that the engine does not rotate (the determination in step S170 is NO), the microcomputer 15 shifts to step S230. In step S230, the microcomputer 15 turns the levels of the drive signals SdH and SdL to the low levels to turn the high-side transistor 21 and the low-side transistor 31 off, respectively. Next, in step S240, the microcomputer 15 reads the levels of the high-side monitor signal SmH and the low-side monitor signal SmL, and determines a failure presently occurring based on the read levels of the monitor signals SmH and SmL in step S250.

Specifically, in this case, even when both the high-side transistor 21 and the low-side transistor 31 are turned on, the starter relay 7 is not turned on. In other words, the microcomputer 15 does not control the starter motor 3, so that it may be considered that any one of the failures in the failure modes [3], [4], [6], and [7] based on the table data T1 (see table 1).

Thus, in step S250, the microcomputer 15 determines that the failure "STA−terminal battery short" in the failure mode [3] occurs when both of the monitor signals SmH and SmL are the high levels. When both the monitor signals SmH and SmL are the low levels, the microcomputer 15 determines that the failure "STA+terminal battery short" in the failure mode [4] occurs.

When the monitor signal SmH is high-level, and the monitor signal SmL is low level, the microcomputer 15 determines that the failure "STA+terminal open" in the failure mode [6] or the failure "STA−terminal open" in the failure mode [7] occurs. When the microcomputer 15 determines that the failure "STA−terminal battery short" in the failure mode [3] occurs, there is the possibility that it is difficult for the low-side transistor 31 to turn off; in other words, there is the possibility that a off-fault of the low-side transistor 31 occurs.

In addition, in step S250, the microcomputer 15 gives information indicative the occurrence of an failure to a user, such as the driver by, for example, turning on a warning light (not shown), displaying a warning message on a display (not shown), and thereafter, shifts to step S220 set forth above. Incidentally, the warning light and the display are previously installed in the vehicle.

When it is determined that the levels of the monitor signals SmH and SmL are abnormal, that is, the levels thereof are the low levels, respectively (the determination in step S210 is NO), the microcomputer 15 shifts to step S250. In step S250, the microcomputer 15 determines a failure presently occurs based on the read levels of the monitor signals SmH and SmL in step S250, thereby giving information indicative of the occurrence of a failure to the driver, shifting to step S220 set forth above.

When shifting from step S210 to step S250, the microcomputer 15 can control the starter motor 3 (starter relay 7), but both the monitor signals SmH and SmL are not the high levels when the ignition switch 29 is in the ON position and each of the transistors 21 and 31 is in off state. Hence, it may be considered that the failure in the failure mode [5] or that in the failure mode [9] occurs (see the table 1).

Thus, in step S250, the microcomputer 15 determines that any one of the failure "STA−terminal ground short" in the failure mode [5] and the failure "low-side transistor on-fault" in the failure mode [9] occurs based on the table data T1 (see the table 1).

On the other hand, in step S140, when it is determined that the engine rotates (the determination in step S140 is YES), that is, when the engine cranking occurs even through the low-side transistor 31 is only turned on, the microcomputer 15 shifts to step S160. In step S160, the microcomputer 15 determines that any one of the failure "STA+terminal battery short" in the failure mode [2] and the failure "high-side transistor on-fault" in the failure mode 181 occurs based on the table data T1 (see the table 1).

In step S160, the microcomputer 15 stores historical information indicative of the determined result in a historical storage area previously allocated in at least one of the RAMs 15*a* including the standby RAM 15*a*1 for storing the historical information. Subsequently, the microcomputer 15 gives information indicative of the occurrence of a failure to the user, such as the driver, of the vehicle as a similar operation in step S250.

Specifically, as shown in the row "engine rotates when the low-side transistor is only turned on" of the following table 2, in a case where no failures occur, turning on of the low-side transistor 31 with the high-side transistor 21 kept off during the on state of the ignition switch 29 causes a current not to flow through the coil 9. This inactivate the starter motor 3, resulting that the engine (starter motor 3) does not rotate (see "not rotate" in the table 2).

TABLE 2

| MONITORED LEVELS WHEN STARTER RELAY IS IN OFF STATE | | NORMAL | STA + TERMINAL BATTERY SHORT | HIGH-SIDE TRANSISTOR ON-FAULT |
|---|---|---|---|---|
| ON STATE OF MAIN RELAY AFTER IGNITION SWITCH IS TURNED OFF | SmH (VmH) | | | |
| | SmL (VmL) | L | H | L |
| ENGINE ROTATES WHEN LOW-SIDE TRANSISTOR IN ONLY TURNED ON | | NOT ROTATE | ROTATE | ROTATE |

Even if any one of the failure "STA+terminal battery short" and the failure "high-side transistor on-fault" occurs, only turning on of the 16 low-side transistor 31 while the ignition switch 29 is in the ON position causes a current to flow through the coil 9. The current flowing through the coil 9 allows the starter relay 7 to turn on, resulting that the starter motor 3 activates to rotate (see "rotate" in the table 2).

Thus, in step S160, the microcomputer 15 determines that the engine (starter motor 3) rotates at the timing of the turning on of the low-side transistor 31, so that the determination in step S140 is YES. The microcomputer 15, therefore, determines that any one of the failure "STA+ terminal battery short" in the failure mode [2] and the failure "high-side transistor on-fault" in the failure mode [8] occurs (see step S160). Subsequently, the microcomputer 15 stores the determined result in the historical storage area previously allocated in one of the RAMs 15*a,* and gives information indicative of the occurrence of a failure to the driver.

After the operation in step S160, the microcomputer 15 proceeds step S150. Incidentally, after the operation in step S160, the microcomputer 15 can skip step S150 to directly shift to step S170. This modification allows control of the starter motor 3 without intentionally turning the high-side transistor 21 on.

In step S220, when determining that the ignition switch 29 is not in the ON position, that is, the ignition switch is in the OFF position (the determination in step S220 is YES), the microcomputer 15 proceeds to step S260.

In step S260, the microcomputer 15 determines whether to detect a failure. Specifically, the microcomputer 15 determines whether the historical information indicative of the occurrence of any one the failure "STA+terminal battery short" and the failure "high-side transistor on". When determining that the historical information is not stored in one of the RAMs 15*a,* the microcomputer 15 shifts to step S300. When one of the RAMs 15*a* stores the historical information (the determination in step S260 is YES), the microcomputer 15 proceeds to step S270.

In step S270, the microcomputer 15 reads the low-side monitor signal SmL to determine whether the low-side monitor signal SmL is high-level. When it is determined that the low-side monitor signal SmL is high-level, the microcomputer 15 proceeds to step S280 to determine that the failure "STA+terminal battery short" occurs, proceeding to step S300.

When it is determined that the low-side monitor signal SmL is low-level, the microcomputer 15 proceeds to step S290 to determine that the failure "high-side transistor on-fault" occurs, proceeding step S300.

Specifically, after the ignition switch 29 has been turned off, when the on state of the main relay 43 causes the battery voltage VB to be continuously supplied to the ECU 1, no battery voltage is supplied to the ignition power line 19. In addition, the microcomputer 15 keeps the transistors 21 and 31 off. This configuration of the low-side monitor signal SmL becomes normally the low level because the voltage VmL becomes 0 [V] by the pull-down function of the resistor 35. In addition, the low-side monitor signal SmL becomes the low level even if the failure "high-side transistor on-fault" occurs (see the table 2).

In contrast, when the failure "STA+terminal battery short" occurs, the voltage VmL becomes the battery voltage, so that the low-side monitor signal SmL becomes the high level (see the table 2), When it is determined that the low-side monitor signal SmL is high-level in step S270, the microcomputer 15 determines that the failure "STA+terminal battery short" occurs in step S280. However, when it is determined that the low-side monitor signal SmL is low-level in step S270, the microcomputer 15 determines that the failure "high-side transistor on fault" occurs in step S290.

Incidentally, when the ignition switch 29 is in the OFF position, no battery voltage Vbat is applied to each of the register 33 and the source of the high-side transistor 21, so that the voltage VmH is inconstant due to the diode 17. The microcomputer 15, therefore, does not refer to the high-side monitor signal SmH.

Next, in step S300, the microcomputer 15 stores the determined fault information obtained by any one of the operations in steps S250, S280, and S290 in the standby RAM 15*a*1 thereof; this fault information indicates determination wherein which failure occurs in the ECU 1. Connecting a fault-diagnosis equipment to the ECU 1 at dealers and/or repair shops allows the fault information stored in the standby RAM 15*a*1 to be read by the equipment.

In step S310, the microcomputer 15 determines whether all operations are completed, which should be executed after the turning off of the ignition switch 29. When determining that all operations are completed, the microcomputer 15 turns the level of the power supply holding signal SP to the low level. The low level of the power supply holding signal SP allows the main relay 43 to turn off, so that the feed of the main supply voltage Vom from the power supply circuit 41 is stopped, resulting that the microcomputer 15 and the ECU 1 deactivate operations.

Incidentally, in the first embodiment, the STA positive and negative terminals 11 and 13 preferably correspond to high-side and low-side terminals according to the present invention, respectively. The high-side and low-side transistors 21 and 31 preferably correspond to high-side and low-side switching elements according to the present invention, respectively.

In the first embodiment, the operations of the microcomputer 15 in steps S270 and S280, the buffer circuit 73, the resistors 35, 36, 71, 75, 77, 81, and the comparator 79 preferably correspond to a failure detecting unit according to the first aspect of the present invention.

In the first embodiment, the operations of the microcomputer 15 in steps S130, S140, and S160, the buffer circuit 73, the resistors 35, 36, 71, 75, 77, 81, and the comparator 79 preferably correspond to a failure detecting unit according to the second aspect of the present invention.

As described above, in the starter-relay drive circuit according to the first embodiment, the operations of the microcomputer 15 in steps S130, S140, and S160 allow detection of each of the failure "STA positive terminal battery short" in the failure mode [2], and the failure "high-side transistor on-fault" in the failure mode [8]. It may be difficult for the conventional ECU to detect any one of the failure "STA positive terminal battery short" in the failure mode [2], and the failure "high-side transistor on-fault" in the failure mode [8].

Specifically, in the first embodiment, it is possible to detect distinctly the failure "STA positive terminal battery short" in the failure mode [2], and the failure "high-side transistor on-fault" in the failure mode [8] by monitoring only whether the engine (starter motor) rotates. This allows the detected result to be nearly free from the influence of analog noises, and it is possible for the microcomputer 15 to detect the failures when the low-side transistor 31 is turned on, immediately diagnosing the starter relay drive circuit.

Moreover, the operations of the microcomputer 15 in steps S260 to S290 permit distinct detection of the failure "STA+terminal battery short" and the failure "high-side transistor on failure" (see the table 2). This allows the fault diagnosis equipment to read the determined result, thereby identifying whether wire harnesses should be repaired or the ECU 1 itself should be repaired based on the read fault information, making it possible to improve the maintenance characteristic of the ECU 1.

Second Embodiment

Figure 3:
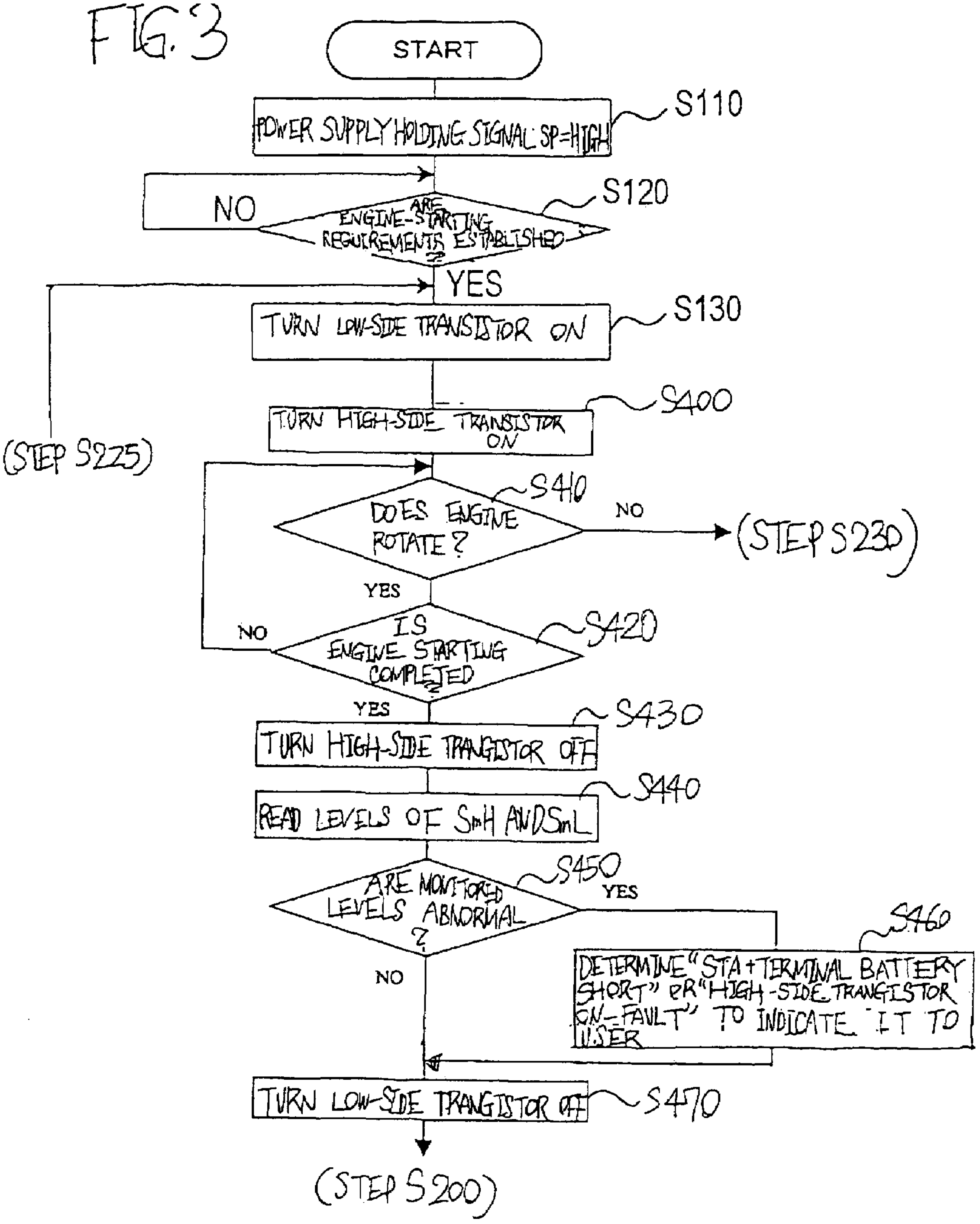
FIG. 3 is a flowchart schematically illustrating operations of a microcomputer according to a second embodiment of the present invention.

FIG. 3 is a flowchart schematically illustrating operations of a microcomputer to detect failures in an ECU serving as a starter-relay drive circuit according to a second embodiment of the present invention.

Incidentally, elements of the ECU according to the second embodiment are substantially identical with those of the ECU 1 shown in FIG. 1, so that descriptions of the elements of the ECU according to the second embodiment are omitted or simplified.

In the first embodiment, after the engine starting requirements have been established, the microcomputer 15 turns the low-side transistor 31 on to monitor whether the engine (starter motor 3) rotates at the timing of the turning on of the low-side transistor 31. Specifically, when determining that the engine rotates at the timing of the turning on of the low-side transistor 31, the microcomputer 15 determines that any one of the failure "STA+terminal battery short" in the failure mode [2] and the failure "high-side transistor on-fault" in the failure mode [8] occurs (see step S160 and the table 2).

In contrast, in the second embodiment, the microcomputer 15 executes other operations, as compared with the operations illustrated in steps S140 to S190 in the first embodiment, to detect that any one of the failure "STA+terminal battery short" in the failure mode [2] and the failure "high-side transistor on-fault" in the failure node [8] occurs.

Specifically, after the engine starting requirements have been established, the microcomputer 15 turns the low-side transistor 31 and the high-side transistor 21 on, respectively (step S130 and step S400 in FIG. 3).

Next, the microcomputer 15 determines whether the engine cranking starts (engine starts to rotate) in step S410.

When it is determined that the engine cranking starts (the determination in step S410 is YES), the microcomputer 15 determines that the starter relay 7 is turned on, proceeding to step S420. In step S420, the microcomputer 15 determines whether the engine starting is completed. When it is determined that the engine starting is not completed (the determination in step S420 is NO), the microcomputer 15 returns to step S410 to repeatedly execute the operations in steps S410 and thereafter.

In contrast, when it is determined that the engine starting is completed (the determination in step S420 is YES), the microcomputer 15 proceeds to step S430. Incidentally, in step S420, the microcomputer 15 can determine that the engine speed is equal to or higher than a predetermined speed regarded such that the engine completely starts up; this predetermined speed may be an idle speed or a speed slightly lower than the idle speed.

In step S430, the microcomputer 15 turns only the high-side transistor 21 off, and reads the levels of the high-side monitor signal SmH and the low-side monitor signal SmL to determine whether the read levels of the monitor signals SmH and SmL are abnormal in step S450.

Specifically, in the second embodiment, the relationship between failure modes in the starter relay drive circuit and each level of each of the monitor signals SmH and SmL when the ignition switch 29 is in the ON position and the high-side transistor 21 is only in off state after the turning on of the starter relay 7 is represented as the following table 3. Incidentally, second table data representing the table 3 is previously stored in one of the RAMs 15*a*.

TABLE 3

| | NORMAL/FAILURE MODE | | | | | | | | |
|---|---|---|---|---|---|---|---|---|---|
| | [1] NORMAL | [2] STA + TERMINAL BATTERY SHORT | [3] STA − TERMINAL BATTERY SHORT | [4] STA + TERMINAL GROUND SHORT | [5] STA − TERMINAL GROUND SHORT | [6] STA + TERMINAL OPEN | [7] STA − TERMINAL OPEN | [8] HIGH-SIDE TRAN-SISTOR ON-FAULT | [9] LOW-SIDE TRAN-SISTOR ON-FAULT |
| SmH (VmH) | L | H | L | L | L | H | H | H | L |
| SmL (VmL) | L | L | H | L | L | L | L | L | L |
| STARTER CONTROL | POSSIBLE | POSSIBLE | IMPOS-SIBLE | IMPOSSIBLE | POSSIBLE | IMPOSSIBLE | IMPOSSIBLE | POSSIBLE | POSSIBLE |

As illustrated in the table 3, when the high-side monitor signal SmH is high-level, and the low-side monitor signal SmL is low-level, any one of the failure "STA+terminal battery short" in the failure mode [2] and that "high-side transistor on-fault" in the failure mode [8] occurs.

That is, in the second embodiment, it is possible to detect the failure "STA+terminal battery short" in the failure mode [2] or that "high-side transistor on-fault" in the failure mode [8] without checking the engine speed.

Specifically, when recognizing that the high-side monitor signal SmH is high-level, and the low-side monitor signal SmL is low-level based on the read levels of the monitor signals SmH and SmL, the microcomputer 15 determines that any one of the failure "STA+terminal battery short" in the failure mode [2] and the failure "high-side transistor on-fault" in the failure mode [8] occurs based on the second table data T2 (see the table 3).

In step S460, the microcomputer 15 stores historical information indicative of the determined result in a historical storage area previously allocated in at least one of the RAMs 15*a* including the standby RAM 15*a*1 for storing the historical information. Subsequently, the microcomputer 15 gives information indicative of the occurrence of a failure to the user, such as the driver, of the vehicle as a similar operation in step S160 or S250.

Next, the microcomputer 15 turns the low-side transistor 31 off in step S470, shifting to step S200 in FIG. 2.

Similarly to the first embodiment, after the ignition switch 29 has been turned off, when the on state of the main relay 43 causes the battery voltage VB to be continuously supplied to the ECU 1, no battery voltage is supplied to the ignition power line 19. In addition, the microcomputer 15 keeps the transistors 21 and 31 off. This configuration of the low-side monitor signal SmL becomes normally the low level because the voltage VmL becomes 0[V] by the pull-down function of the resistor 35. In addition, the low-side monitor signal SmL becomes the low level even if the failure "high-side transistor on-fault" occurs (see the following table 4).

In contrast, when the failure "STA+terminal battery short" occurs, the voltage VmL becomes the battery voltage, so that the low-side monitor signal SmL becomes the high level (see the table 4) When it is determined that the low-side monitor signal SmL is high-level in step S270, the microcomputer 15 determines that the failure "STA+terminal battery short" occurs in step S280. However, when it is determined that the low-side monitor signal SmL is low-level in step S270, the microcomputer 15 determines that the failure "high-side transistor on fault" occurs in step S290.

TABLE 4

| MONITORED LEVELS WHEN STARTER RELAY IS IN OFF STATE | | NORMAL | STA + TERMINAL BATTERY SHORT | HIGH-SIDE TRANSITOR ON-FAULT |
|---|---|---|---|---|
| ON STATE OF MAIN RELAY AFTER IGNITION SWITCH IS TURNED OFF | SmH (VmH) | — | — | — |
| | SmL (VmL) | L | H | L |

In the second embodiment, the operations of the microcomputer 15 in steps S130, S400 to S460, the buffer circuit 73, the resistors 35, 36, 71, 75, 77, 81, and the comparator 79 preferably correspond to a failure detecting unit according to the third aspect of the present invention.

As described above, in the second embodiment, the microcomputer 15 determines whether the monitored levels of the monitor signals SmH and SmL are abnormal after turning on of the starter relay 7. This makes it possible to detect at least one of the failures without influencing the starting of the engine.

In each of the first and second embodiments, when detecting the failure "STA+terminal battery short" and the failure "high-side transistor on-fault" with no distinction, it is possible to omit the operations shown in step S260 to S290.

In the first and second embodiments, when detecting only the failure "STA+terminal battery short" in the failure "STA+terminal battery short" and the failure "high-side transistor on-fault", it is possible to omit the operations shown in step S140, S160, S260, and S290. In addition, when determining that the ignition switch 29 shifts from the ON position to the OFF position, the microcomputer 15 can be programmed to shift to step S270 to determine whether the low-side monitor signal SmL is high-level. When it is determined that the low-side monitor signal SmL is not high-level, for example, is low-level, the microcomputer 15 can be programmed to shift to step S300 with the low-side monitor signal SmL kept at the low-level.

In each of the first and second embodiments, the ECU 1 individually outputs the drive signals SdH and SdL through output ports for the transistors 21 and 31. In the present invention, the ECU can be configured to output a single drive signal to both the inverter 27 for turning on and off the high-side transistor 21 and the gate of the low-side transistor 31. Specifically, the single drive signal serves as both the drive signals SdH and SdL. This can save one output port of the ECU 1. In this case, it is possible to omit the operations shown in step S140, S160, S260, and S290. In addition, when determining that the ignition switch 29 shifts from the ON position to the OFF position, the microcomputer 15 can be programmed to shift to step S270 to determine whether the low-side monitor signal SmL is high-level. When it is determined that the low-side monitor signal SmL is not high-level, such as low-level, the microcomputer 15 can be programmed to shift to step S300 with the low-side monitor signal SmL kept at the low-level. Because of providing commonality of the drive signal SdL and the drive signal SdH as the single drive signal, it is possible to omit the operations in step S130 in the operations in steps S130 and S150, and to turn the single drive signal to the high level in step S150.

In each of the first and second embodiments, MOS FETs are used as the high-side and low-side transistors 21 and 31, respectively. As the transistors 21 and 31, other types of switching elements, for example, bipolar transistors, can be used.

In each of the first and second embodiments, necessary tasks have been performed after the turning-off of the ignition switch 29. After that, turning-off of the main relay 43 allows power consumption of the battery 5 to decrease while the ignition switch 29 is in the OFF position.

If it is unnecessary to consider power consumption of the battery 5 while the ignition switch 29 is in the OFF position, power from the battery 5 can be constantly supplied to the ECU 1 without passing through the main relay 43. This modification allows the microcomputer 15 of the ECU 1 to constantly operate, and when the ignition switch 29 is turned on, the microcomputer 15 can execute the operations in steps S110 to S310 except for the operations in step S10 and S310 in FIG. 2.

In each of the first and second embodiments, indication of the occurrence of a failure to the user can be executed at any given time.

In each of the first and second embodiments, as pull-up and pull-down elements, registers are used, but other types of pull-up and pull-down elements can be used.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A starter-relay control circuit for a vehicle, the vehicle including a starter relay, a starter motor connected to the starter relay and rotatable based on an operation of the starter relay, a battery and an ignition switch connected to a positive terminal of the battery, the starter-relay control circuit comprising:
- a high-side terminal connected to one end of a coil of the starter relay;
- a low-side terminal connected to the other end of the coil;
- a high-side switching element connected between a first output line connected to the high-side terminal and an ignition power line connected to the ignition switch;
- a low-side switching element connected between a second output line connected to the low-side terminal and a ground line connected to a negative terminal of the battery;
- a pull-up element connected between the ignition power line and the first output line;
- a pull-down element connected between the ground line and the second output line; and
- a failure detecting unit connected to the first and second output lines and configured to determine whether a failure wherein the high-side terminal is short-circuited to the positive terminal of the battery occurs based on a voltage of the second output line when the ignition switch is in an off position.

2. A starter-relay control circuit according to claim 1, wherein the failure detecting unit comprises:
- a level determining circuit connected to the second output line and configured to compare a first voltage based on the voltage of the second output line with a predetermined voltage to output a monitor signal with a high level or a low level based on the compared result,
- wherein the failure detecting unit is configured to determine whether the failure occurs based on whether the signal has the high level or the low level.

3. A starter-relay control circuit according to claim 2, wherein the level determining circuit has:
- a pull-down circuit connected to the second output line and the ground line and configured to pull down the second output line to the ground line, the pull-down circuit serving as a first voltage divider that divides the voltage of the second output line to generate the first voltage; and
- a second voltage divider connected to the battery and configured to divide a voltage of the battery to generate the predetermined voltage.

4. A starter-relay control circuit for a vehicle, the vehicle including a starter relay, a starter motor connected to the starter relay and rotatable based on an operation of the starter relay, a battery and an ignition switch connected to a positive terminal of the battery, the starter-relay control circuit comprising:
- a high-side terminal connected to one end of a coil of the starter relay;
- a low-side terminal connected to the other end of the coil;
- a high-side switching element having a control terminal and connected between a first output line connected to the high-side terminal and an ignition power line connected to the ignition switch;
- a low-side switching element having a control terminal and connected between a second output line connected to the low-side terminal and a ground line connected to a negative terminal of the battery;
- a pull-up element connected between the ignition power line and the first output line;
- a pull-down element connected between the ground line and the second output line; and
- a failure detecting unit connected to the first and second output lines, the control terminal of the high-side switching element, and the control terminal of the low-side switching element, the failure detecting unit being configured to:
- turn, in response to a turning on of the ignition switch, the second switching element on with the first switching element kept off to determine whether the starter motor rotates; and
- detect any one of a first failure wherein the high-side terminal is short-circuited to the positive terminal of the battery and a second failure wherein the first switching element is constantly in on state occurs when it is determined that the starter motor rotates.

5. A starter-relay control circuit according to claim 4, further comprising:
- a storing unit configured to store historical information representing that any one of the first failure and the second failure occurs; and
- a determining unit configured to determine whether the historical information is stored in the storing unit in response to a turning off of the ignition switch to identify which of the first and second failures occurs based on a voltage of the second output line when it is determined that the historical information is stored in the storing unit.

6. A starter-relay control circuit according to claim 5, wherein the determining unit comprises:

a level determining circuit connected to the second output line and configured to compare a first voltage based on the voltage of the second output line with a predetermined voltage to output a monitor signal with a high level or a low level based on the compared result, wherein the determining unit is configured to identify which of the first and second failures occurs based on whether the signal has the high level or the low level.

7. A starter-relay control circuit according to claim 6, wherein the level determining circuit has:

a pull-down circuit connected to the second output line and the ground line and configured to pull down the second output line to the ground line, the pull-down circuit serving as a first voltage divider that divides the voltage of the second output line to generate the first voltage; and a second voltage divider connected to the battery and configured to divide a voltage of the battery to generate the predetermined voltage.

8. A starter-relay control circuit for a vehicle, the vehicle including a starter relay, a starter motor connected to the starter relay and rotatable based on an operation of the starter relay, a battery and an ignition switch connected to a positive terminal of the battery, the starter-relay control circuit comprising:

a high-side terminal connected to one end of a coil of the starter relay;

a low-side terminal connected to the other end of the coil;

a high-side switching element having a control terminal and connected between a first output line connected to the high-side terminal and an ignition power line connected to the ignition switch;

a low-side switching element having a control terminal and connected between a second output line connected to the low-side terminal and a ground line connected to a negative terminal of the battery;

a pull-up element connected between the ignition power line and the first output line;

a pull-down element connected between the ground line and the second output line; and a failure detecting unit connected to the first and second output lines, the control terminal of the high-side switching element, and the control terminal of the low-side switching element, the failure detecting unit being configured to:

turn the first and second switching elements on to determine whether the starter motor rotates;

turn the first switching element off with the second switching element kept on when it is determined that the starter motor rotates;

read a level of a first monitor signal through the first output line and a level of a second monitor signal through the second output line; and detect any one of a first failure wherein the high-side terminal is short-circuited to the positive terminal of the battery and a second failure wherein the first switching element is constantly in on state occurs based on the read levels of the first and second monitor signals.

9. A starter-relay control circuit according to claim 8, wherein the failure detecting unit comprises:

a first level determining circuit connected to the first output line and configured to compare a first voltage of the first output line with a predetermined voltage to output the first monitor signal whose level is set to a high level or a low level based on the compared result; and a second level determining circuit connected to the second output line and configured to compare a second voltage of the second output line with a predetermined voltage to output the second monitor signal whose level is set to a high level or a low level based on the compared result, wherein the failure detecting unit is configured to detect which of the first failure and the second failure occurs based on whether each of the levels of the first and second monitor signals is the high level or the low level.

10. A starter-relay control circuit according to claim 9, wherein the second level determining circuit has:

a pull-down circuit connected to the second output line and the ground line and configured to pull down the second output line to the ground line, the pull-down circuit serving as a first voltage divider that divides a voltage applied to the second output line to generate the second voltage; and a second voltage divider connected to the battery and configured to divide a voltage of the battery to generate the predetermined voltage.

* * * * *